June 12, 1956     A. L. SCOTT     2,749,643
HOLLOW SHAFT FOR FISHING RODS
Filed Dec. 31, 1952

INVENTOR.
ARTHUR L. SCOTT
BY
Kenyon & Kenyon
ATTORNEYS

United States Patent Office 2,749,643
Patented June 12, 1956

2,749,643

HOLLOW SHAFT FOR FISHING RODS

Arthur L. Scott, Columbia, S. C., assignor to Columbia Products Company, Columbia, S. C., a corporation of South Carolina Application December 31, 1952, Serial No. 329,008

2 Claims. (Cl. 43—18)

This invention relates to the production of shafts which have properties making them suitable for use in fishing rods or in other places requiring similar properties.

It relates particularly to such shafts which are made of glass fibres, which are bonded together with a suitable flexible plastic bonding agent.

Heretofore such shafts have been made using longitudinally-extending glass fibres to serve as tension and compression members resisting the bending of the shaft. Some such shafts have been made in which a balsa wood core is employed and in which a layer of longitudinally-extending glass fibres is applied to the balsa wood core, the fibres serving as tension and compression members. Such sticks have the disadvantage that the balsa wood cores are relatively expensive and fragile, tend to absorb moisture, change dimensionally with changing humidity, are nonhomogeneous and nonuniform in density, are not impervious to weather deterioration, and add useless weight to the stick because they do not have any material strength.

Other shafts have been made in which the entire shaft consists of the longitudinally-extending glass fibres held together by the bonding agent. These shafts are relatively heavy and the glass fibres in the interior of the shaft are positioned substantially at the neutral axis and do not exert their full potential as tension and compression members.

Some hollow shafts have been made. However, these have in general consisted of cloth or of braided fibres bonded together with the bonding agent. In such shafts the glass fibres are not used most efficiently to serve as tension and compression members and hence the shafts are not of the lightest possible weight for given strength.

One of the objects of the present invention is to provide a shaft of the type above described in which the glass fibres are so disposed that the full potential of the fibres as compression and tension members is utilized so that the shaft presents the greatest strength for a given weight of glass fibres.

Another object is to provide such a shaft which is hollow and in which the surface fibres all extend longitudinally to provide maximum use of their potential as tension and compression members, while other glass fibres are disposed so as to serve as web members to resist collapsing of the rod and to maintain the moment of bending inertia of the shaft by maintaining beam depth between the longitudinally-extending tension and compression members.

Another object is to provide such a shaft which does not have a core having the disadvantages of the balsa wood core.

Other objects and advantages of the invention will appear from the following description of the invention.

For the purpose of illustrating the invention, there are shown in the accompanying drawings a form thereof which is at present preferred, although it will be understood that the instrumentalities of which the invention consists may be variously arranged and organized and that the invention is not limited to the specific arrangement and organization of the instrumentalities as herein shown and described. In the drawings.

In general the invention consists of a hollow shaft having a substantially uniform outer layer of longitudinally-extending glass fibre members and an inner layer of circumferentially-extending glass fibre members.

Each of the fibres is bonded to adjacent fibres and maintained in position by a flexible plastic bonding agent. The outer longitudinally-disposed fibres serve as tension and compression members to resist bending of the shaft. They also serve as reinforcing members to prevent separation of the circumferentially-extending fibres when the shaft is bent. The inner circumferentially-extending fibres serve as reinforcing means to prevent separation of the longitudinally-extending fibres. They also serve as a reinforcing web to maintain beam depth between the longitudinally-extending fibres so that they may function efficiently as tension and compression members.

Figure 2:
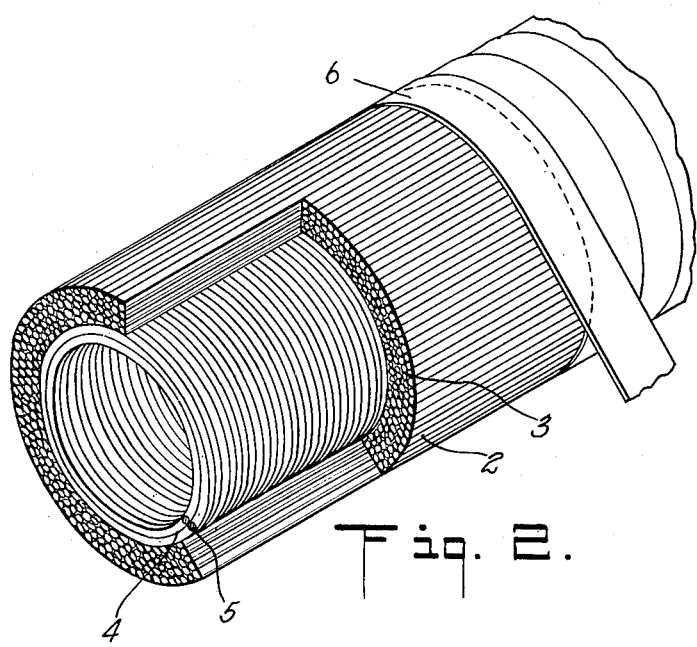
Fig. 2 is a perspective view partially broken away showing the arrangement of the parts.
Figure 1:
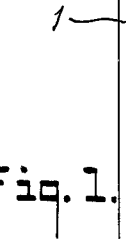
Fig. 1 is a view of a shaft made in accordance with the invention.

In the form of invention shown in Figs. 1 and 2, the shaft is shown generally at 1. The stick is a flexible resilient shaft which may be used for all purposes requiring such a shaft. It is particularly adapted for use in making fishing rods. In making such rods, suitable guides, handles and ferrules are applied to make a finished rod or section of a rod.

The rod consists of a substantially uniform outer layer 2 which consists of a plurality of longitudinally-extending glass fibre members. These fibres are very fine and may have diameters of approximately two microinches and a tensile strength of approximately 300,000 pounds per square inch.

Within the outer layer is an inner layer 4 of circumferentially-extending, and in this case, spirally-wound contiguous glass fibre members 5.

All of the fibres are bound each to the next adjacent fibre by means of a suitable flexible plastic resin. A resin of the polyester type which may be cured by the application of heat at approximately 190° F. for approximately four hours is a satisfactory resin. It is applied by coating the glass filaments or fibres prior to the assembly thereof into the shaft.

In the preferred form of the invention 30 parts by weight of resin are used to coat 70 parts by weight of glass fibres. This proportion may, however, be varied.

After the fibres are coated, they are assembled on a suitable, tapered core, which is not shown. The glass fibres 5 are spirally wound on the core in contiguous relationship.

Thereafter the outer coat, layer 2, is applied. Thereafter the entire stick is wrapped in a cellophane strip 6 which compacts the fibres and holds them in the desired shape. They are then cured by the application of heat for the appropriate amount of time at the desired degree of heat to set the resin which had been coated on the fibres prior to their assembly. Thereafter the core is removed, leaving a hollow center in the rod, and the cellophane strip 6 is likewise removed.

In the preferred form of the invention the inner circumferentially-extending fibres comprise about 20 per cent of the total fibres by weight and the fibres of the outer layer comprise about 80 per cent by weight of the glass fibres employed.

The rod thus formed has highly desirable properties, particularly for a fishing rod. It is extremely light in weight and has a high strength per unit of weight. The longitudinally-extending fibres 3 of the outer layer 2 all lie near the surface of the shaft and serve as tension and compression members to resist bending. They are thus positioned at the most advantageous point to obtain their full potential as tension and compression members.

The inner circumferentially-extending fibres 5 serve as web members to maintain the spacing or beam depth between the longitudinally-extending fibres on diametrically opposite sides of the shaft and thus maintain the moment of bending inertia of the shaft.

The longitudinally-extending fibres 3 likewise serve as reinforcing members to prevent separation of contiguous turns of the circumferentially-extending fibres 5, thus making them serve more effectively as web members and in developing the full potential strength of the material.

The circumferentially-extending members 5 likewise serve to prevent separation of the longitudinally-extending members giving greater strength per unit of weight.

By placing the circumferentially-wound fibres inside the other fibres, it is possible to use a minimum of circumferentially-extending fibres to give the desired reinforcing effect, and the longitudinally-extending fibres which serve as tension and compression members are spaced farther apart, thus greatly increasing the moment of bending inertia of the shaft for a given weight of fibre.

The present invention may be embodied in other specific forms without departing from the spirit thereof. It is therefore desired that the present embodiments be considered in all respects as illustrative and not restrictive, reference being had to the appended claims rather than to the foregoing description to indicate the scope of the invention.

What is claimed is:

1. A resilient flexible hollow shaft for fishing rods consisting of a substantially uniform outer layer of longitudinally-extending glass fibre members forming the outer surface of said shaft, and a substantially uniform inner layer consisting of spirally-wound contiguous glass fibre members, each of said glass fibre members being bonded to adjacent glass fibre members and maintained in position with a flexible plastic bonding agent, said outer longitudinally disposed glass fibre members comprising substantially 80% of the fibres of said shaft and defining means to resist tension and compression during bending of said shaft and to prevent separation of contiguous turns of said spirally wound glass fibre members on bending of said shaft and said spirally wound glass fibre members comprising substantially 20% of the fibres of said shaft and defining means to prevent separation of said longitudinally-extending fibre members and to maintain the longitudinally-extending glass fibre members in sheath-like form about said spirally-wound members.

2. A resilient flexible hollow shaft for fishing rods consisting of a substantially uniform outer layer of longitudinally-extending glass fibre members forming the outer surface of said shaft, and a substantially uniform inner layer consisting of spirally-wound contiguous glass fibre members, each of said glass fibre members being bonded to adjacent glass fibre members and maintained in position with a flexible plastic bonding agent, said outer longitudinally disposed glass fibre members comprising a substantial majority of the fibres of said shaft and defining means to resist tension and compression during bending of said shaft and to prevent separation of contiguous turns of said spirally wound glass fibre members on bending of said shaft and said spirally wound glass fibre members defining means to prevent separation of said longitudinally-extending fibre members and to maintain the longitudinally-extending glass fibre members in sheath-like form about said spirally-wound members.

References Cited in the file of this patent

UNITED STATES PATENTS

| | | |
|---|---|---|
| 2,234,560 | Keyes | Mar. 11, 1941 |
| 2,402,040 | Goldman | June 11, 1946 |
| 2,573,361 | Rodgers | Oct. 30, 1951 |
| 2,594,693 | Smith | Apr. 29, 1952 |
| 2,602,766 | Francis | July 8, 1952 |

FOREIGN PATENTS

| | | |
|---|---|---|
| 627,255 | Great Britain | Aug. 4, 1949 |